Patented May 21, 1929.

1,713,576

UNITED STATES PATENT OFFICE.

KLAUS WEINAND, OF COLOGNE-FLITTARD, GERMANY, ASSIGNOR TO GRASSELLI DYE-STUFF CORPORATION, OF NEW YORK, N. Y., A CORPORATION OF DELAWARE.

PROCESS OF MAKING 1-4-DIARYLAMINO-5-8-DIHYDROXYANTHRAQUINONE.

No Drawing. Application filed June 26, 1926, Serial No. 118,847, and in Germany July 3, 1925.

My invention consists in 1-4-diarylamino-5-8-dihydroxy-anthraquinones and processes of making the same.

It is well known that hydroxy-anthraquinone compounds react with arylamines in presence of condensing agents such as boric acid, hydrochloric acid etc., to form arylamino-anthraquinones. Better results are obtained if leuco-hydroxy-anthraquinones are reacted upon with arylamines and condensing agents, these leuco-arylamino-anthraquinones are then easily oxidized to the arylamino-anthraquinones. This oxidation already takes place, at least to a certain extent, if air, or the parent hydroxy-anthraquinones, are present during the condensation, or can be effected subsequent to the condensation.

I have found that 1-4-diarylamino-5-8-dihydroxy-anthraquinone is produced in a very convenient manner if the condensation of leuco-1-4-5-8-tetra-hydroxy-anthraquinone with an arylamine is effected in the presence of arsenic acid, which simultaneously with the condensation effects the oxidation of the intermediately formed leuco-compound. The yields of pure products are nearly quantitative and the reaction proceeds at a relatively low temperature of around 100° C. and even in practically anhydrous conditions.

This is of particular interest inasmuch as the usual condensing agents produce 1-4-diarylamino-5-8-dihydroxy-anthraquinones from the leuco-tetra-hydroxy-anthraquinone and arylamines only with very unsatisfactory yields and purity. Experiments made in this direction have shown that by carrying out the reaction in the old and well known manner mostly tarry products with very little 1-4-diarylamino-5-8-dihydroxy-anthraquinone are obtained.

The novel 1-4-diarylamino-5-8-dihydroxy-anthraquinones are of the general formula:

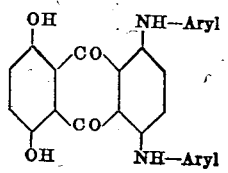

They are valuable intermediates for the production of dyestuffs.

The following examples will further illustrate my invention, the parts being by weight:

*Example 1.*—4 parts 1-4-5-8-leuco-tetra-hydroxy-anthraquinone are dissolved in 40 parts p-toluidine and heated to 100° C. 1 part arsenic acid is now introduced; after 15 minutes heating 0.8 parts boric acid are added, the reaction starts immediately and the melt is heated for 1 to 1½ hours. The melt is worked up as usual and a good yield of 1-4-di-p-toluido-5-8-dihydroxy-anthraquinone of the formula:

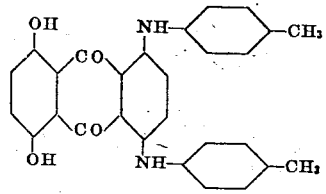

is obtained.

*Example 2.*—4 parts 1-4-5-8-leuco-tetra-hydroxy-anthraquinone are dissolved in 40 parts aniline and at 100° C. 1 part arsenic acid is introduced; after 15 minutes heating 0.8 parts boric acid are added. The reaction starts immediately and the melt is heated for 1 to 1½ hours. The melt is worked up as usual and a good yield of 1-4-di-anilido-5-8-dihydroxy-anthraquinone of the formula

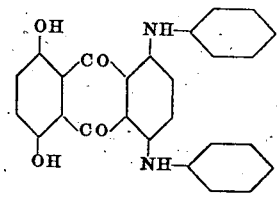

is obtained.

I claim:

1. The process of making 1-4-diarylamino-5-8-dihydroxy-anthraquinones which comprises heating under practically anhydrous conditions leuco-1-4-5-8-tetra-hydroxy-anthraquinone with an arylamine in the presence of arsenic acid and a condensing agent.

2. The process of making 1-4-diarylamino-5-8-dihydroxy-anthraquinone which comprises heating to about 100° C. under practically anhydrous conditions leuco-1-4-5-8-tetro-hydroxy-anthraquinone with an arylamine in the presence of arsenic acid and boric acid.

3. The process of making 1-4-di-p-toluido-5-8-dihydroxy-anthraquinone which comprises heating to about 100° C. under practically anhydrous conditions leuco-1-4-5-8-tetra-hydroxy-anthraquinone with p-toluidine in the presence of arsenic and boric acids.

In testimony whereof I have hereunto set my hand.

KLAUS WEINAND.